(12) United States Patent
Vergnes et al.

(10) Patent No.: US 8,131,789 B2
(45) Date of Patent: Mar. 6, 2012

(54) TRUE RANDOM NUMBER GENERATOR

(75) Inventors: Alain Vergnes, Trets (FR); Frederic Schumacher, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 985 days.

(21) Appl. No.: 12/058,309

(22) Filed: Mar. 28, 2008

(65) Prior Publication Data

US 2009/0248771 A1 Oct. 1, 2009

(51) Int. Cl.
*G06F 7/58* (2006.01)
(52) U.S. Cl. ...................................................... 708/251
(58) Field of Classification Search ........................ None
See application file for complete search history.

(56) References Cited

U.S. PATENT DOCUMENTS 6,807,553 B2 * 10/2004 Oerlemans .................... 708/252

(Continued)

*Primary Examiner* — David H Malzahn
(74) *Attorney, Agent, or Firm* — Fish & Richardson P.C.

(57) ABSTRACT

True random number generation circuitry utilizes a pair of oscillators driving a pair of linear feedback shift registers, with their output being combined to generate random numbers. At least one of the oscillators is programmable with a variable frequency. One embodiment controls the variable frequency of oscillators with output from one or more sets of oscillators and linear feedback shift registers. In other embodiments, linear feedback shift register output is captured and used to control the frequency of oscillators.

22 Claims, 14 Drawing Sheets

U.S. PATENT DOCUMENTS

| | | | |
|---|---|---|---|
| 6,954,770 B1* | 10/2005 | Carlson et al. | 708/251 |
| 7,424,500 B2* | 9/2008 | Fukushima et al. | 708/251 |
| 2003/0236803 A1* | 12/2003 | Williams | 708/252 |
| 2005/0203979 A1* | 9/2005 | Clements et al. | 708/251 |
| 2008/0270501 A1* | 10/2008 | Fujita et al. | 708/251 |
| 2008/0313249 A1* | 12/2008 | Fukushima et al. | 708/251 |
| 2009/0172055 A1* | 7/2009 | Radja et al. | 708/251 |
| 2009/0248771 A1* | 10/2009 | Vergnes et al. | 708/251 |

* cited by examiner

TRUE RANDOM NUMBER GENERATOR

FIELD OF THE INVENTION

The present invention generally relates to random number circuitry and, more specifically, to circuitry for generating true random numbers.

BACKGROUND OF THE INVENTION

A random number generator (often abbreviated as RNG) is a computational or physical device designed to generate a sequence of numbers or symbols that lack any pattern, i.e., appear random. Computer-based systems for random number generation are widely used, but often fall short of this goal, though they may meet some statistical tests for randomness intended to ensure that they do not have any easily discernible patterns. Methods for generating random results have existed since ancient times, including dice, coin flipping, the shuffling of playing cards, the use of yarrow stalks in the I Ching, and many other techniques.

Pseudo-random number generators ("PRNG"s) are algorithms that can automatically create long runs (for example, millions of numbers long) with good random properties but eventually the sequence repeats exactly (or the memory usage grows without bound). One of the most common PRNGs is the linear congruential generator, which uses the recurrence $X_{n+1}=(aX_n+b)$ mod m to generate numbers. The maximum number of numbers the formula can produce is the modulus, m. Most computer programming languages include functions or library routines that purport to be random number generators. They are often designed to provide a random byte or word, or a floating point number, uniformly distributed between 0 and 1. Such library functions often have poor statistical properties and some will repeat patterns after only tens of thousands of trials. They are often initialized using a computer's real time clock as the seed. These functions may provide enough randomness for certain tasks (for example video games) but are unsuitable where high-quality randomness is required, such as in cryptographic applications, statistics or numerical analysis. Many operating systems provide better PRNGs with statistically more random results. Yet, they are still pseudo-random and often compute intensive.

There is general agreement that, if there are such things as "true" random numbers, they are most likely to be found by looking at physical processes which are, as far as we know, unpredictable. This unpredictability is the distinguishing factor of a true random number generator ("TRNG"). A physical random number generator can be based on an essentially random atomic or subatomic physical phenomenon whose randomness can be traced to the laws of quantum mechanics. An example of this are the Atari 8-bit computers, which used noise from an analog circuit to generate true random numbers. Other examples include radioactive decay, thermal noise, shot noise and clock drift. To provide a degree of randomness intermediate between specialized hardware on the one hand and algorithmic generation on the other, some security related computer software requires the user to input a lengthy string of mouse movements, or keyboard input. All of these random number generators utilizing physical processes are slow (in terms of computer speeds), expensive, and invariably require custom hardware that typically cannot be integrated onto an integrated circuit ("IC").

BRIEF SUMMARY OF THE INVENTION

True random number generation circuitry utilizes a pair of oscillators driving a pair of linear feedback shift registers, with their output being combined to generate random numbers. At least one of the oscillators is programmable with a variable frequency. One embodiment controls the variable frequency of oscillators with output from one or more sets of oscillators and linear feedback shift registers. In other embodiments, linear feedback shift register output is captured and used to control the frequency of oscillators.

DETAILED DESCRIPTION OF THE INVENTION

Embodiments of the present invention are useful in, for example, cryptography applications where a true random number is required. Various embodiments are a pure digital circuitry architecture that complies with true random number generator well-known/de-facto standard test suite like NIST 800-22 and/or DIEHARD. It is primarily based on 2 independent variable frequency ring oscillators ("VFRO") whose outputs feed independent linear feedback shift registers ("LFSR"). The values provided by these LFSRs are mixed together and the resulting value provided to a software user interface. A bit part-select of the first LFSR output is used in one embodiment to modify the VFRO frequency and vice-versa, creating variable frequency of the ring oscillators in an unpredictable way.

This architecture embodiment benefits from utilizing several variable frequency ring oscillators with their variable frequencies deriving from their scrambled and interlaced phases. Validation test suite were passed with a pure digital circuitry architecture. There is no need of utilizing analog cells and the high unpredictability of the results remains guaranteed. This architecture can typically be fully modeled using RTL code and is thus fully synthesizable by computer automated tools.

Figure 1:
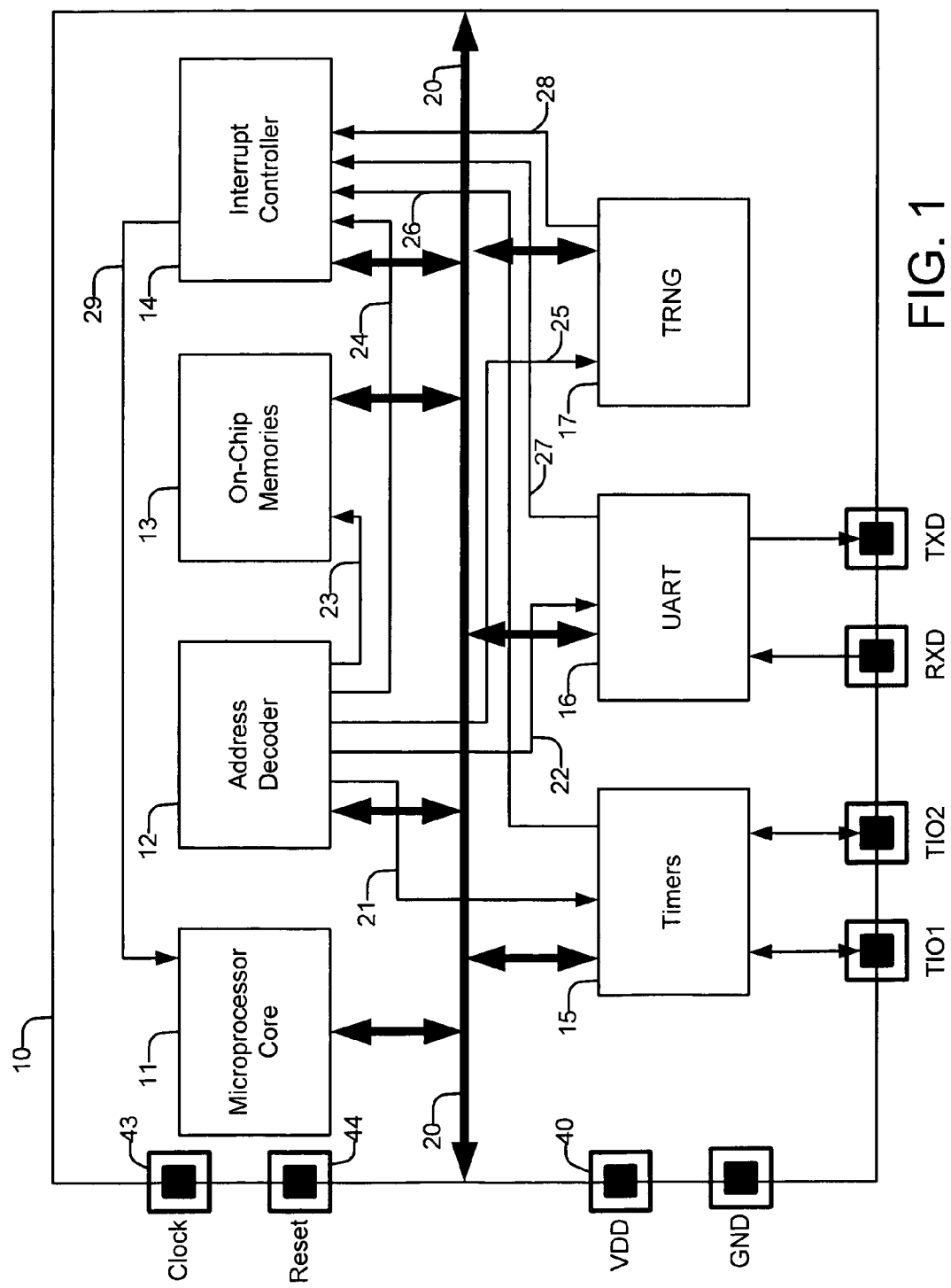
FIG. 1 is a drawing illustrating a microcontroller with an embedded TRNG module, in accordance with the present invention.

Embodiments of the invention typically take place in an integrated circuit of microcontroller type but can be placed in any other kind of circuit. FIG. 1 represents a simple microcontroller with a TRNG module connected as a peripheral of the microprocessor core.

FIG. 1 is a drawing illustrating a microcontroller with an embedded TRNG module, in accordance with an embodiment of the invention. A microcontroller 10 comprises a microprocessor 11 being able to access peripheral circuitries like Timers 15, Universal Asynchronous Receiver/Transmitter ("UART") 16, and True Random Number Generator ("TRNG") controller 17. The data exchanges are typically performed by means of the system bus 20 which comprises (not shown) a read data bus carrying data from peripherals to microprocessor, a write data bus carrying data from microprocessor 11 to peripherals, an address bus, and control signals to indicate transfer direction on system bus 20. In an embodiment, since the address bus of the system bus is typically shared by all peripherals connected to the system, it is desirable to decode the values carried on this bus to select one peripheral at a time. A circuitry 12 acts as an address decoder by receiving the address bus (part of system bus 20) signals and provides select signals 21, 22, 23, 24, 25. These select signals will be typically read by peripheral circuits 15, 16, 13, 14, 17, respectively, to take into account values of signals carried on system bus 20.

On-chip memories 13 can be utilized to store the application software processed by microprocessor 101. The chip 10 is powered by means of different set of terminals 40. Terminals 40 comprises a series of physical access terminals ("PAD"s) to power the microcontroller 10, some for providing voltage (VDD), some for providing Ground (GND). Also available are Clock 43 and Reset 44 PADs. A user application typically runs software which is loaded within on-chip memories 13 during startup of the microcontroller (boot section). The software located in on-chip memory 13 is fetched by microprocessor 11 by means of system bus 20. The on-chip memory 13 is selected (signal 23 is active) as soon as the address value of the address bus matches the address range allocated for the on-chip memory. The address decoder 12 is typically designed accordingly, the address range used at startup being hard-wired in the address decoder. As a response, the memory provides the corresponding data onto the system bus 20, which is read by microprocessor 11, and processed accordingly. If software requires TRNG data, the microprocessor 11 is then instructed to load data from TRNG 17 using read accesses performed on the system bus 20. The address value placed on system bus 20 causes the address decoder 12 to set the select signal 25. TRNG module 17 will then provide its data on the system bus 20, that will be read by microprocessor 11. The software may also be aware of the availability of a data through an interrupt signal 27. When set, this interrupt signal 27 triggers an interrupt module 14. Then the interrupt controller 14 signals the event directly to a dedicated pin of the microprocessor 11. A central interrupt module typically allows any number of interrupts to be handled by a single input pin on the microprocessor. When the microprocessor is triggered by the interrupt signal, its internal state machine interrupts the processing of the current task and performs a read access on the interrupt controller 14 by means of system bus 20 to get the source (peripheral) of interrupt. Then the software interrupt handler may performs, for example, a read access on TRNG module 17 to get a new data that can be used further in the software processing.

The architecture details of examples of a TRNG module 17 are provided in FIGS. 2-10. For these FIGs., as well as for FIG. 11 following them, thin lines indicate what is typically a single bit signal, while thick lines indicate what are typically multi-bit signals, for example, thirty-two (32) bits wide in the example shown in FIG. 11.

Figure 2:
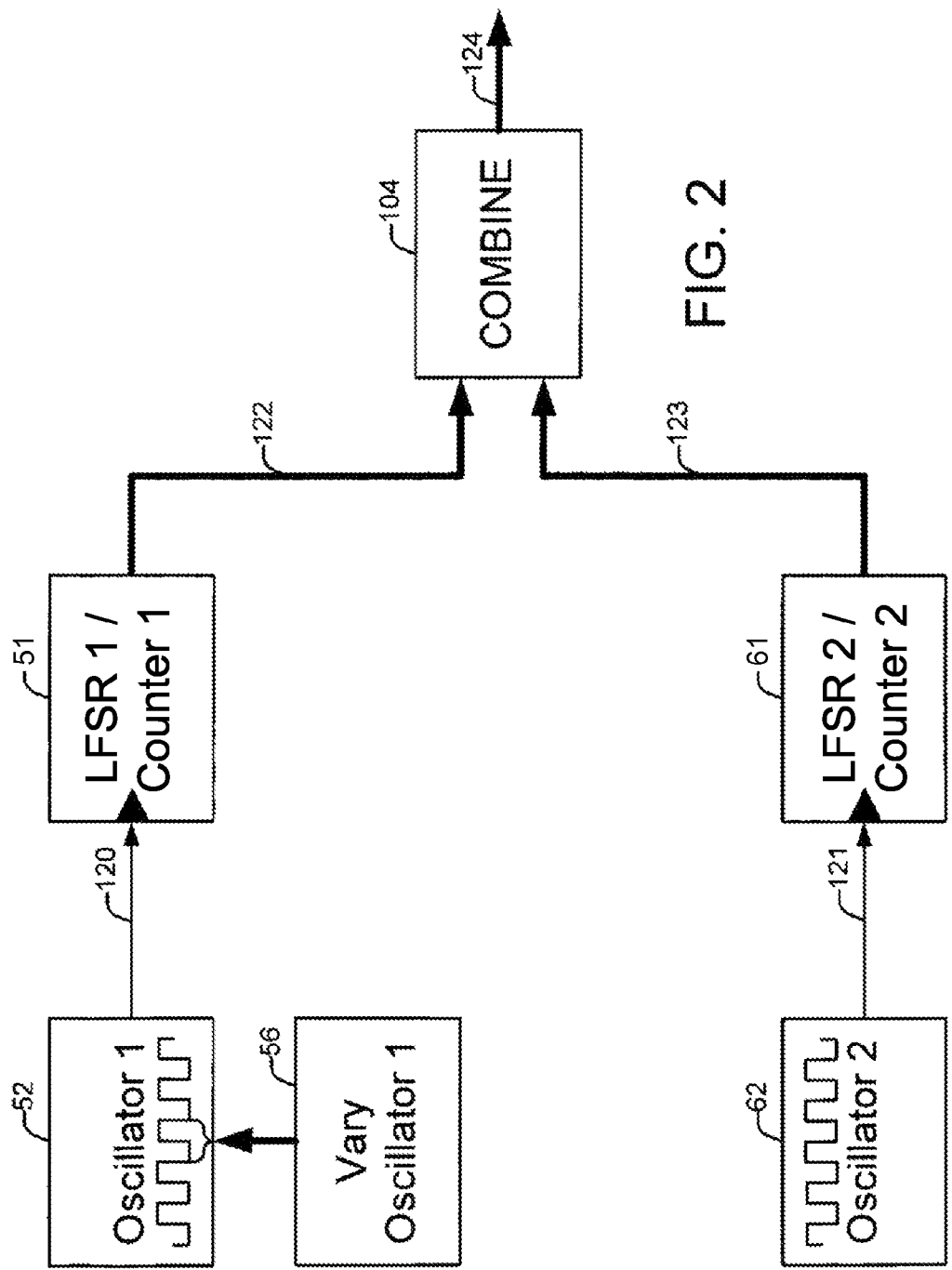
FIG. 2 is a drawing showing an example of true random number generator ("TRNG"), in accordance with a first embodiment of the present invention.
Figure 12:
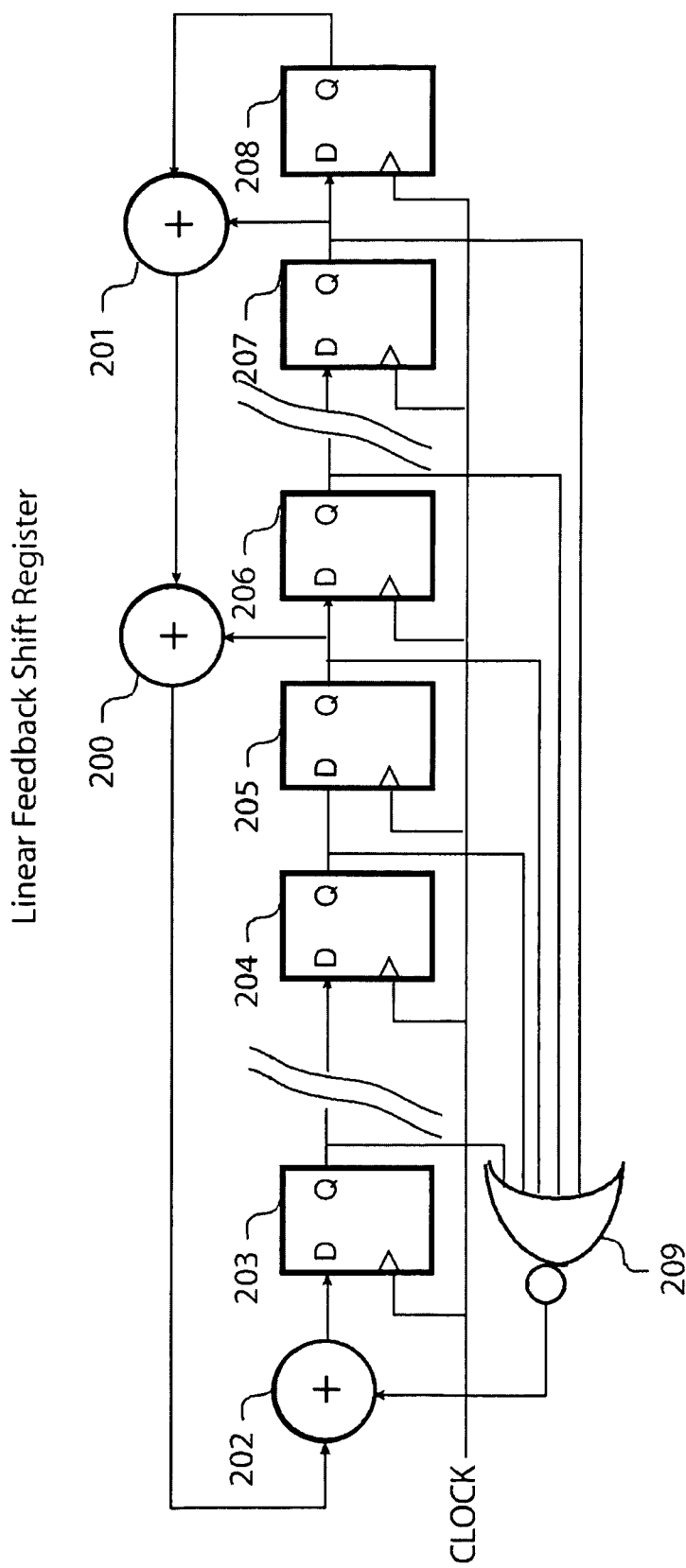
FIG. 12 is a drawing illustrating details of a typical Linear Feedback Shift Register ("LFSR"), in accordance with one embodiment of the present invention.
Figure 13:
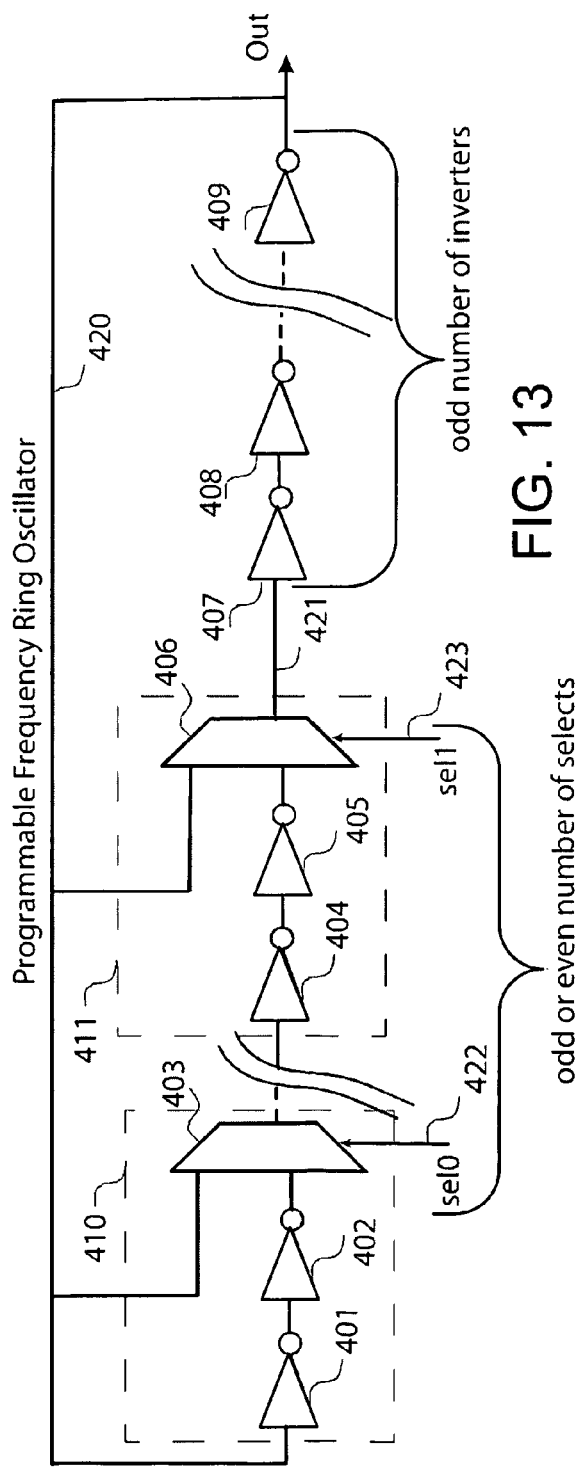
FIG. 13 is a drawing illustrating a programmable variable frequency ring oscillator ("VFRO"), in accordance with one embodiment of the present invention.

FIG. 2 is a drawing showing an example of a true random number generator ("TRNG"), in accordance with a first embodiment of the present invention. In this example, a pair of oscillators 52, 62 or clock generators are shown, with each oscillator 52, 62 coupled to and providing a single bit stream signal as a clock signal 120, 121 to a Linear Feedback Shift Register (LFSR) or counter 51, 61, respectively. Generally, the two LFSR polynomials (see FIG. 12 below) are different for the two LFSRs including potentially different high order terms and "taps". In this embodiment, the first oscillator 52 is a variable frequency oscillator ("VFO") providing a numerically controlled or varied frequency output clock signal 120, dependent upon input select signal(s) 422, 423 (see FIG. 13), while the second oscillator is a fixed frequency oscillator ("FFO") 62 providing a fixed frequency output clock signal 121. An example of a variable frequency oscillator ("VFO") is a variable frequency ring oscillator ("VFRO"), an example of which is shown in FIG. 13. An example of a fixed frequency oscillator ("FFO") is a fixed frequency ring oscillator ("FFRO") similar to the VFRO shown in FIG. 13, except that it does not contain the variable delay elements of the VFRO controlled by select signals 422, 423. The output signals 122 from the first LFSR/Counter 51 and the output signals 123 from the second LFSR/Counter 61 are combined in a combinational mixer module 104 (see FIG. 11 for an example) to generate the true random number generator (TRNG) signal 124 which is the output of the TRNG module 17.

In this example, a means to vary the first oscillator frequency 56 is shown providing one or more control or select signals to the first oscillator 52 to dynamically vary the frequency of the output clock signals 120 from the first oscillator. Various such means for varying the first oscillator 52 frequency 56 are shown in subsequent FIGs. and embodiments. Other such means for varying the first oscillator 52 frequency 56 are also within the scope of the present invention.

A linear feedback shift register (LFSR) 54, 64 is may be used instead of a binary counter in this FIG. 2. A fixed frequency oscillator coupled to and providing clock signals to a LFSR provides a value which is "pseudo-random", since it ultimately repeats and can therefore be predicted. Typical linear feedback shift register (LFSR) architecture details is shown in FIG. 12 below. However, other methods of generating pseudo-random numbers are also within the scope of the present invention, including a non-binary code counter.

The resulting bit stream 122 from the first LFSR/Counter 51 could be predicted if a FFO were used as a first oscillator 52 and there were no second LFSR/Counter 61, since such an LFSR/Counter 51 is ruled by a linear equation with a polynomial characterizing its intrinsic behavior. It is therefore a PRNG, instead of a desired TRNG. In order to create a more unpredictable system, a VFO is used as the first oscillator 52 and a second branch is added. This second branch includes a FFO 62 as a second oscillator running at a different frequency than the first oscillator 52 and providing a clock signal 121 to a second LFSR/Counter 61 with a polynomial different from the first LFSR/Counter 51. Both LFSR/Counter 51, 61 outputs 122, 123 are then combined together within Combinational Mixer 104 to form a resulting value 124 which is extremely difficult to predict. Therefore it is termed a "true random number generator" ("TRNG"). The Combinational Mixer 104 can be made of a series of 2-input XOR cells, with each bit of the LFSR.sub.1 54 being XORed with the corresponding bit of LFSR.sub.2 64 (refer to FIG. 11).

Figure 3:
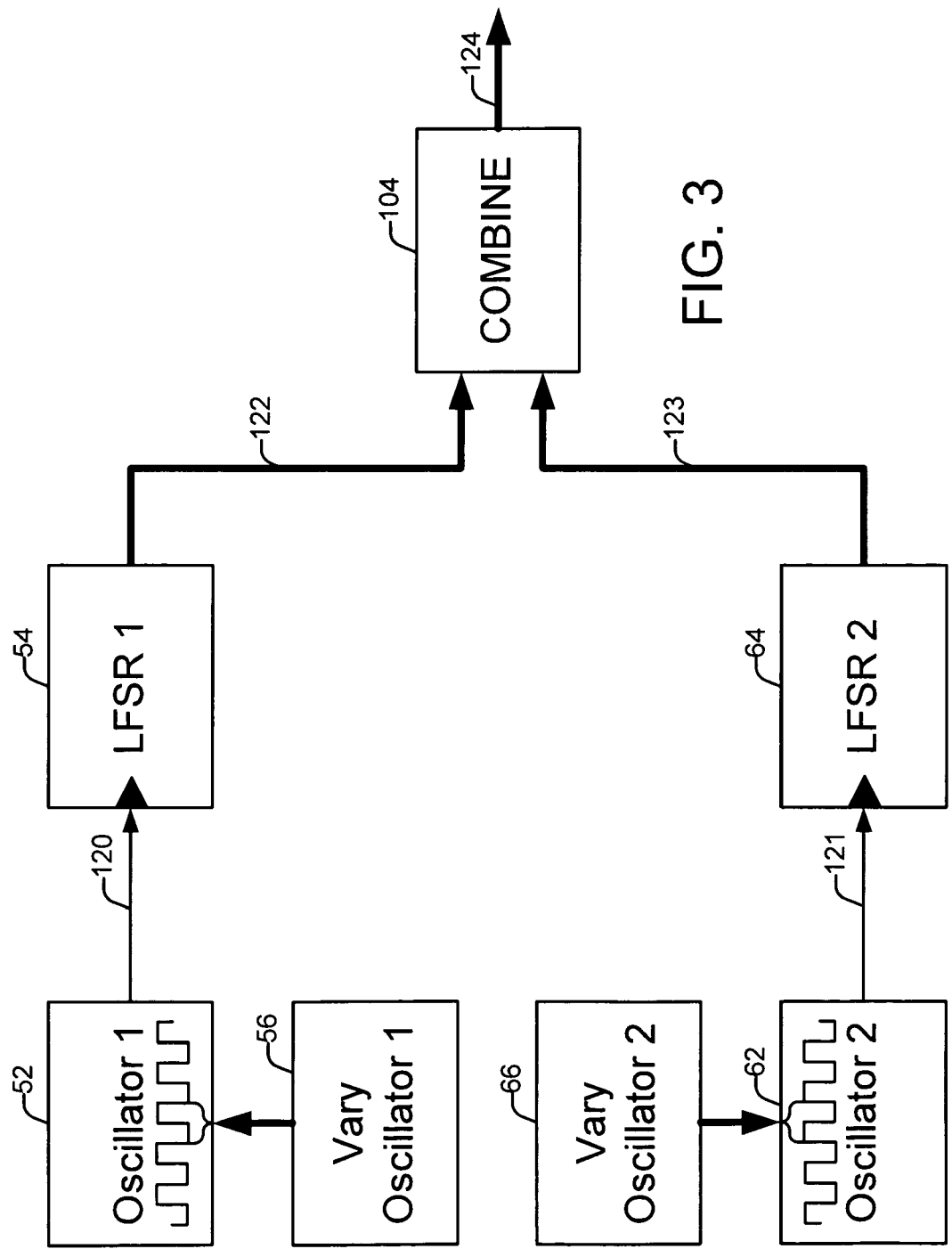
FIG. 3 is a drawing showing an example of true random number generator ("TRNG"), in accordance with a second embodiment of the present invention.

FIG. 3 is a drawing showing an example of a true random number generator ("TRNG"), in accordance with a second embodiment of the present invention. This example is similar to the embodiment shown in FIG. 2, except that the second oscillator 62 is a variable frequency oscillator which is responsively coupled to and whose frequency is controlled or modified by a means to vary the second oscillator frequency 66. As with the means to vary the of the first oscillator 52 frequency 56 in FIG. 2, various such means to vary the second oscillator frequency 56 are shown in subsequent FIGs. and embodiments.

Figure 4:
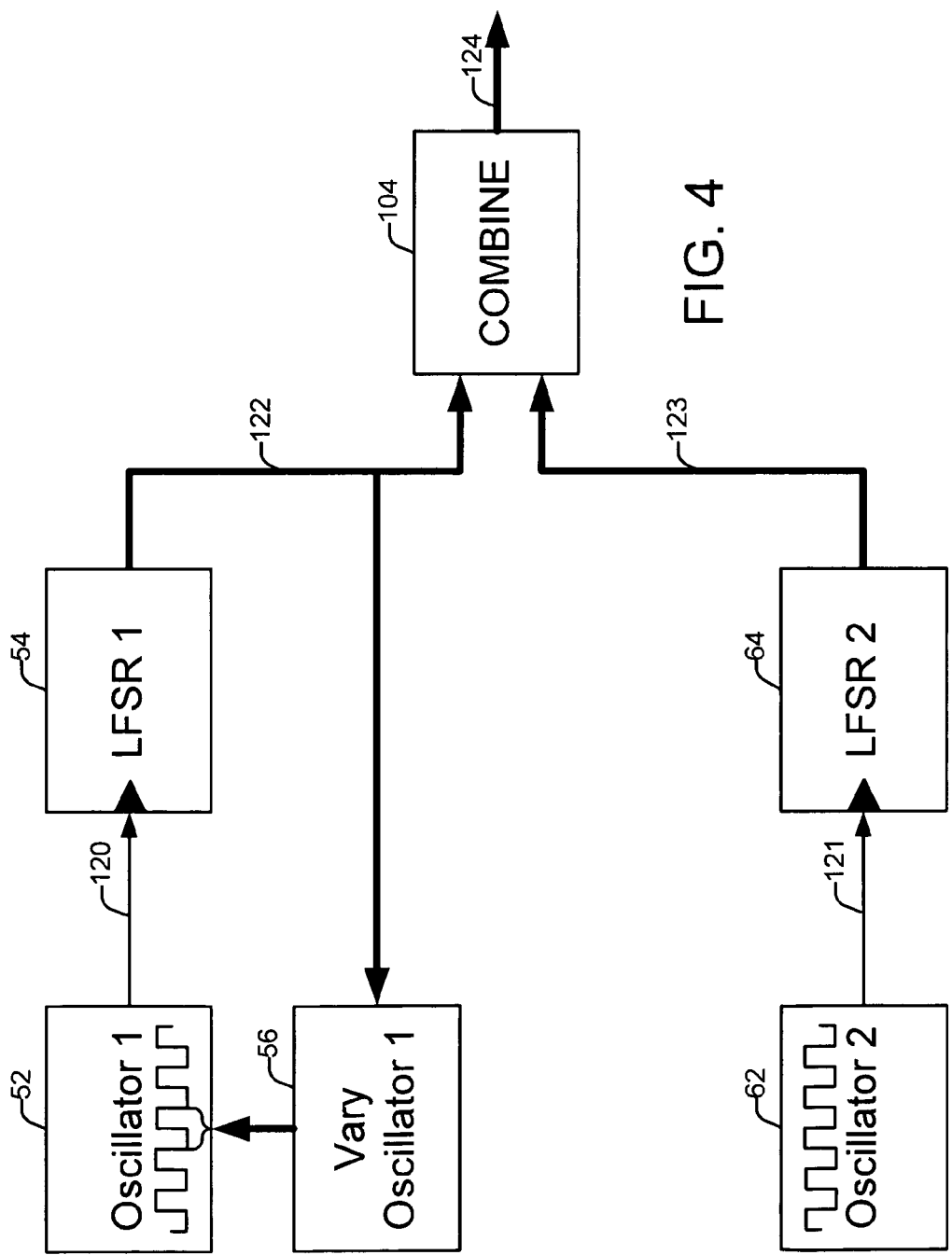
FIG. 4 is a drawing showing an example of true random number generator ("TRNG"), in accordance with a third embodiment of the present invention.

FIG. 4 is a drawing showing an example of a true random number generator ("TRNG"), in accordance with a third embodiment of the present invention. This example is similar to the embodiment shown in FIG. 2, except that the means to vary the first oscillator 52 frequency 56 is responsively coupled to output signals 122 from the first LFSR 54 in order to provide pseudorandom variation of the first oscillator 52 frequency.

Figure 5:
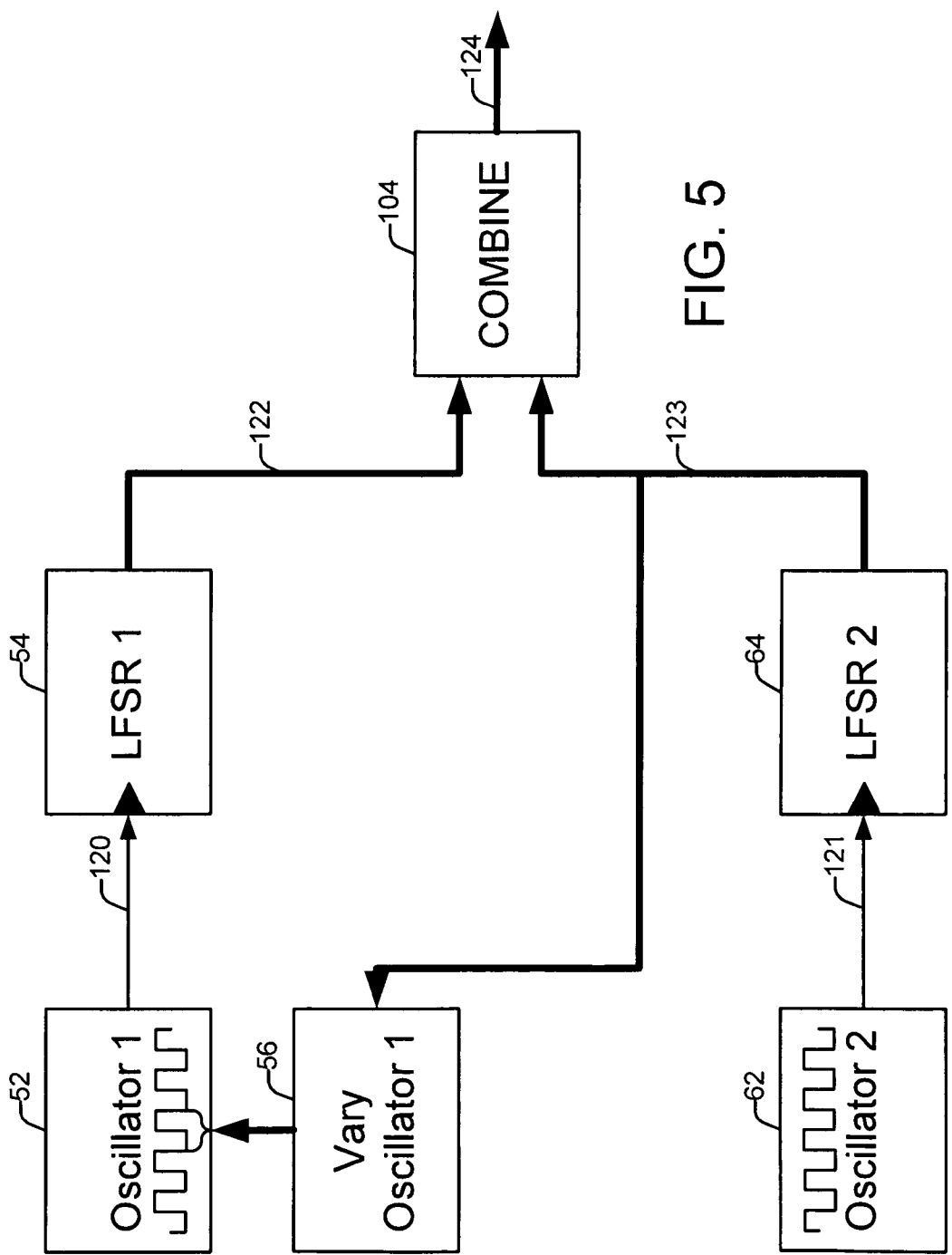
FIG. 5 is a drawing showing an example of true random number generator ("TRNG"), in accordance with a fourth embodiment of the present invention.

FIG. 5 is a drawing showing an example of a true random number generator ("TRNG"), in accordance with a fourth embodiment of the present invention. This example is similar to the embodiment shown in FIG. 4, except that the means to vary the first oscillator 52 frequency 56 is responsively coupled to output signals 123 from the second LFSR 64 in order to provide interlaced pseudorandom variation of the first oscillator 52 frequency 56.

Figure 6:
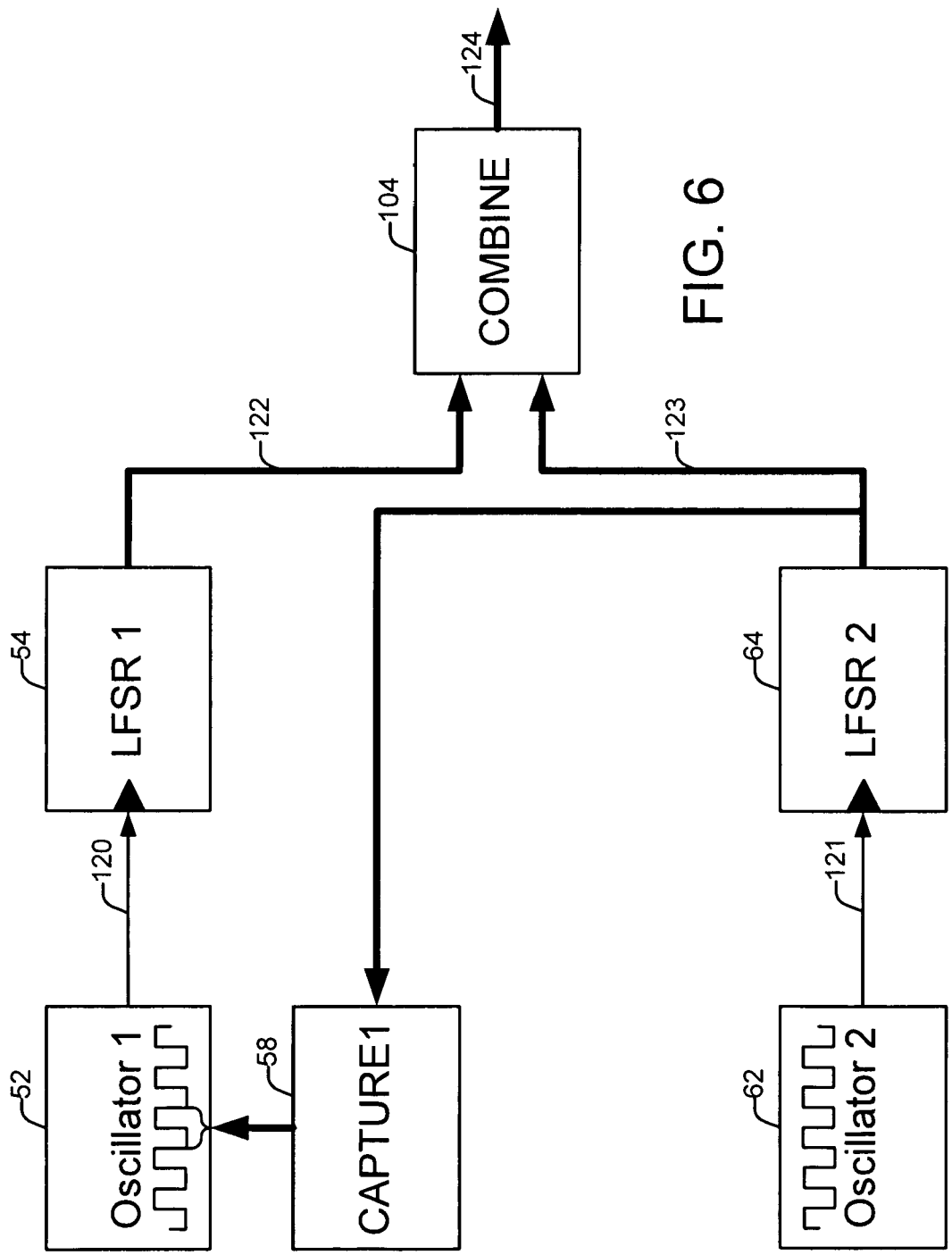
FIG. 6 is a drawing showing an example of true random number generator ("TRNG"), in accordance with a fifth embodiment of the present invention.

FIG. 6 is a drawing showing an example of a true random number generator ("TRNG"), in accordance with a fifth embodiment of the present invention. This example is similar to the embodiment shown in FIG. 5, except that the means to vary the first oscillator 52 frequency 56 is a first capture circuit 58 responsively coupled to and capturing output signals 123 from the second LFSR 64 in order to provide pseudorandom variation of the first oscillator 52 frequency.

The Sampling/Hold and Processing (SHP) or capture circuitry 58 captures the output 123 of LFSR 64 and adapts it to the number of bits of select for VFO 52. This can be done, for example, by capturing a bit part-select of the LFSR 64 output 123 or combining some part of the LFSR 64 output 123 to reduce to the desired number of bit (size of select input of 52). It may use the clock signal 120 from VFO 52 to trigger the SHP circuitry. The variation of frequency can be applied at different periods of time. In this example, a timer circuitry and a comparator may be designed accordingly in SHP module 58. If a pseudo random value is required for the frequency variation, one can, for example, design a LFSR within SHP module 58 to act as a comparison value with the embedded timer to define the period of variation. Other different circuitries can be designed in this module according to the specifications of the period variations, in accordance with an embodiment of the present invention.

Figure 7:
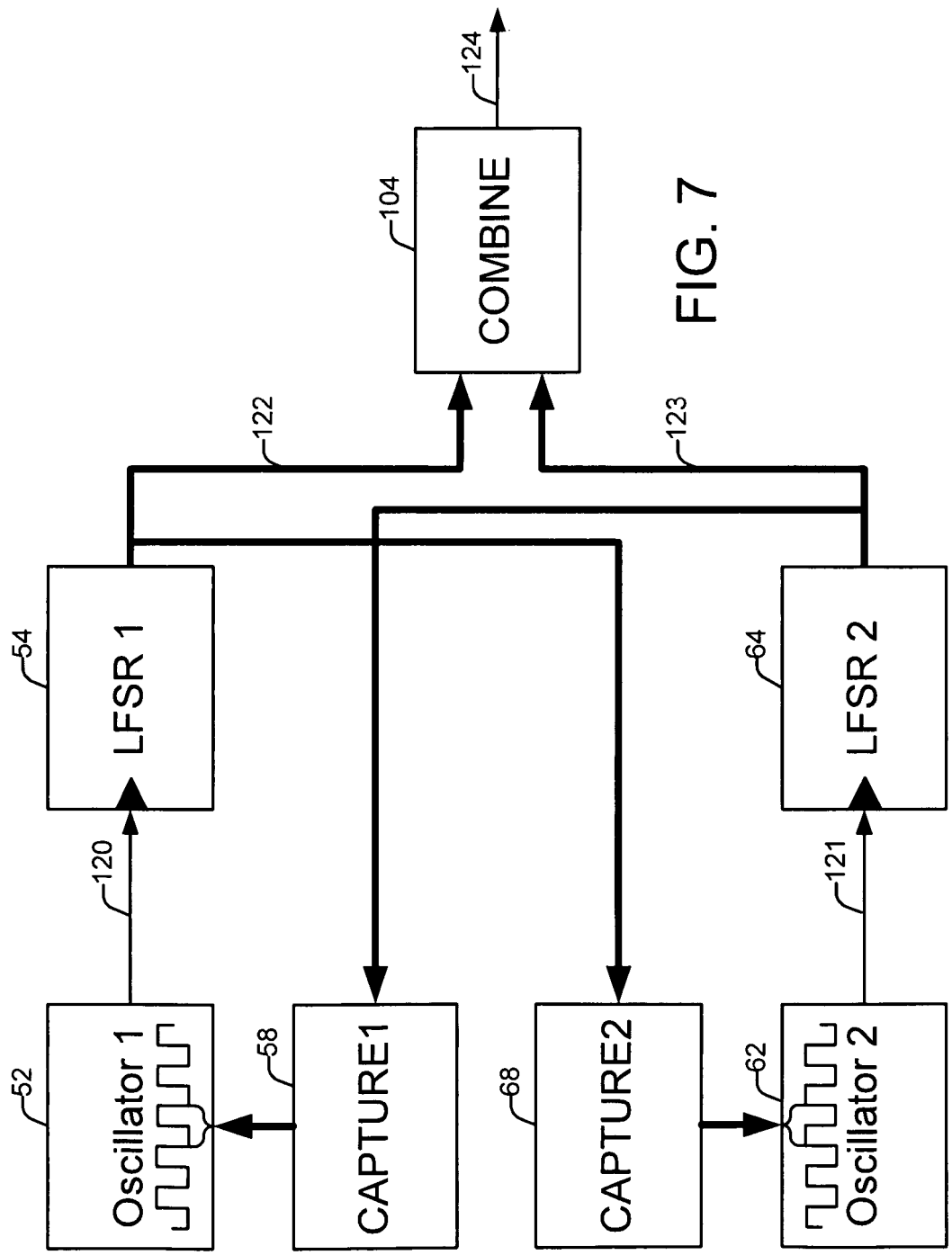
FIG. 7 is a drawing showing an example of true random number generator ("TRNG"), in accordance with a sixth embodiment of the present invention.

FIG. 7 is a drawing showing an example of a true random number generator ("TRNG"), in accordance with a sixth embodiment of the present invention. This embodiment may be seen as a combination of other previously shown embodiments. This doubly interlaced embodiment has a first capture circuit 58 that is responsively coupled to output signals 123 from the second LFSR 64 and is coupled to and provides control or select signals to the first oscillator 52 in order to provide pseudorandom variation of the first oscillator 52 frequency. Similarly, a second capture circuit 68 is responsively coupled to output signals 122 from the first LFSR 54 and is coupled to and provides control or select signals to the second oscillator 62 in order to provide pseudorandom variation of the second oscillator 62 frequency.

Figure 8:
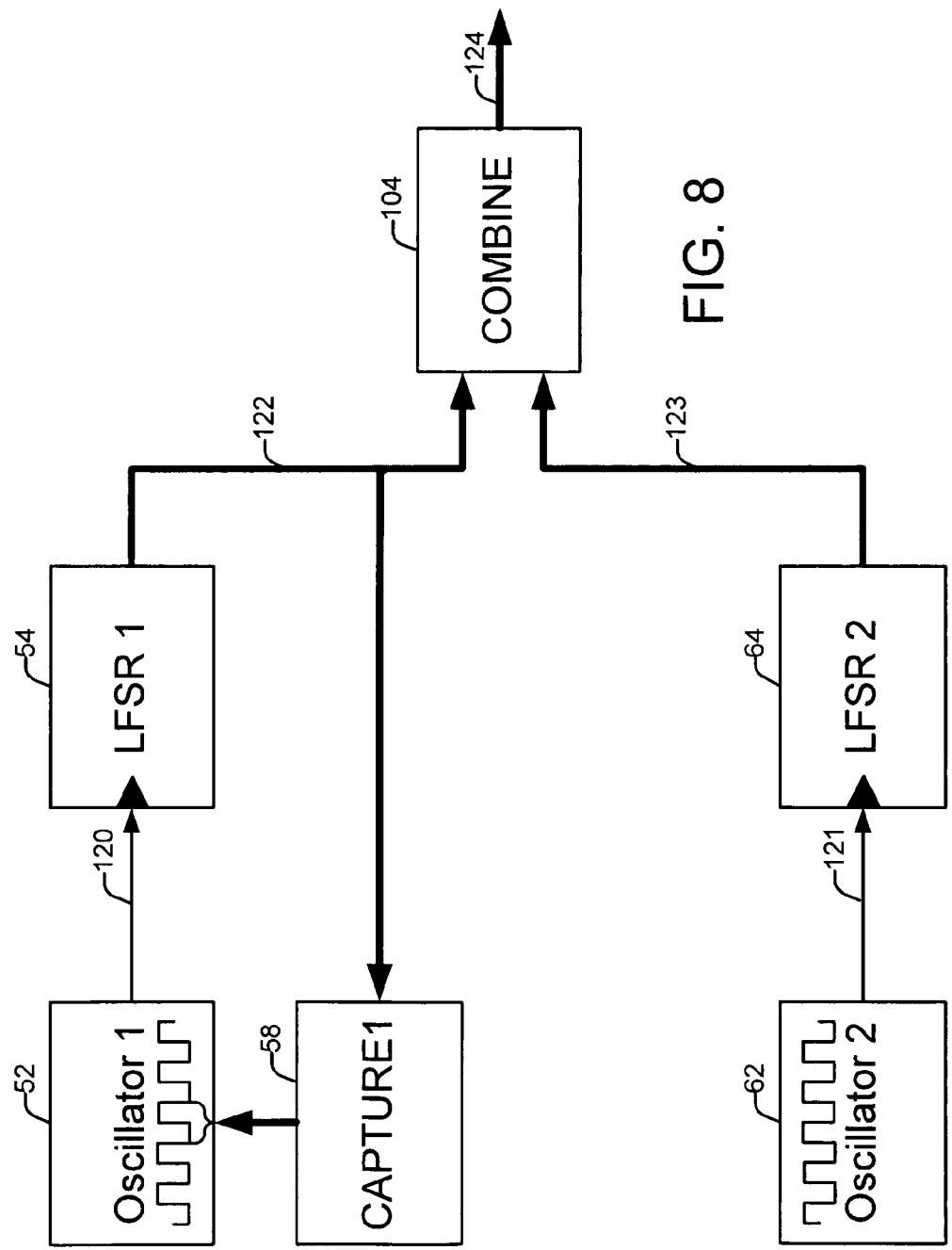
FIG. 8 is a drawing showing an example of true random number generator ("TRNG"), in accordance with a seventh embodiment of the present invention.

FIG. 8 is a drawing showing an example of a true random number generator ("TRNG"), in accordance with a seventh embodiment of the present invention. This example is similar to the embodiment shown in FIG. 4, except that the means to vary the first oscillator 52 frequency 56 is a first capture circuit 58 responsively coupled to and capturing the output signals 122 of the first LFSR 54 in order to provide pseudorandom variation of the first oscillator 52 frequency.

Figure 9:
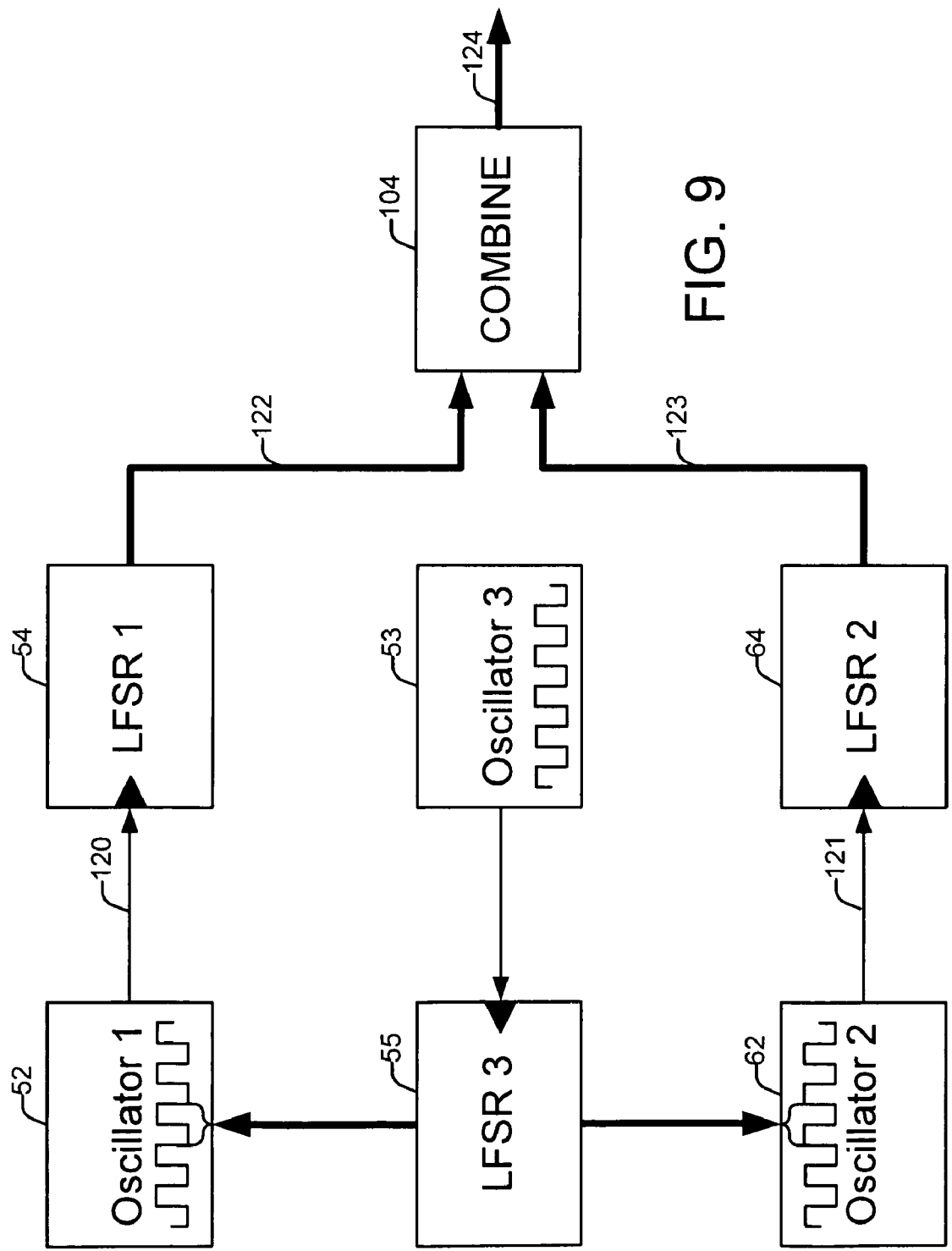
FIG. 9 is a drawing showing an example of true random number generator ("TRNG"), in accordance with an eighth embodiment of the present invention.

FIG. 9 is a drawing showing an example of a true random number generator ("TRNG"), in accordance with an eighth embodiment of the present invention. This embodiment is similar to the embodiment shown in FIG. 3. In this embodiment, both the first oscillator 52 and second oscillator 62 are variable frequency oscillators whose frequencies are controlled by output signals from a PRNG. The PRNG comprises a third oscillator 53 that is coupled to and provides a clock signal to a third LFSR 55. The third LFSR 55 is in turn is coupled to and provides control or select signals to the first oscillator 52 and second oscillator 62 in order to provide pseudorandom variation of the first oscillator 52 and second oscillator 62 frequencies.

Figure 10:
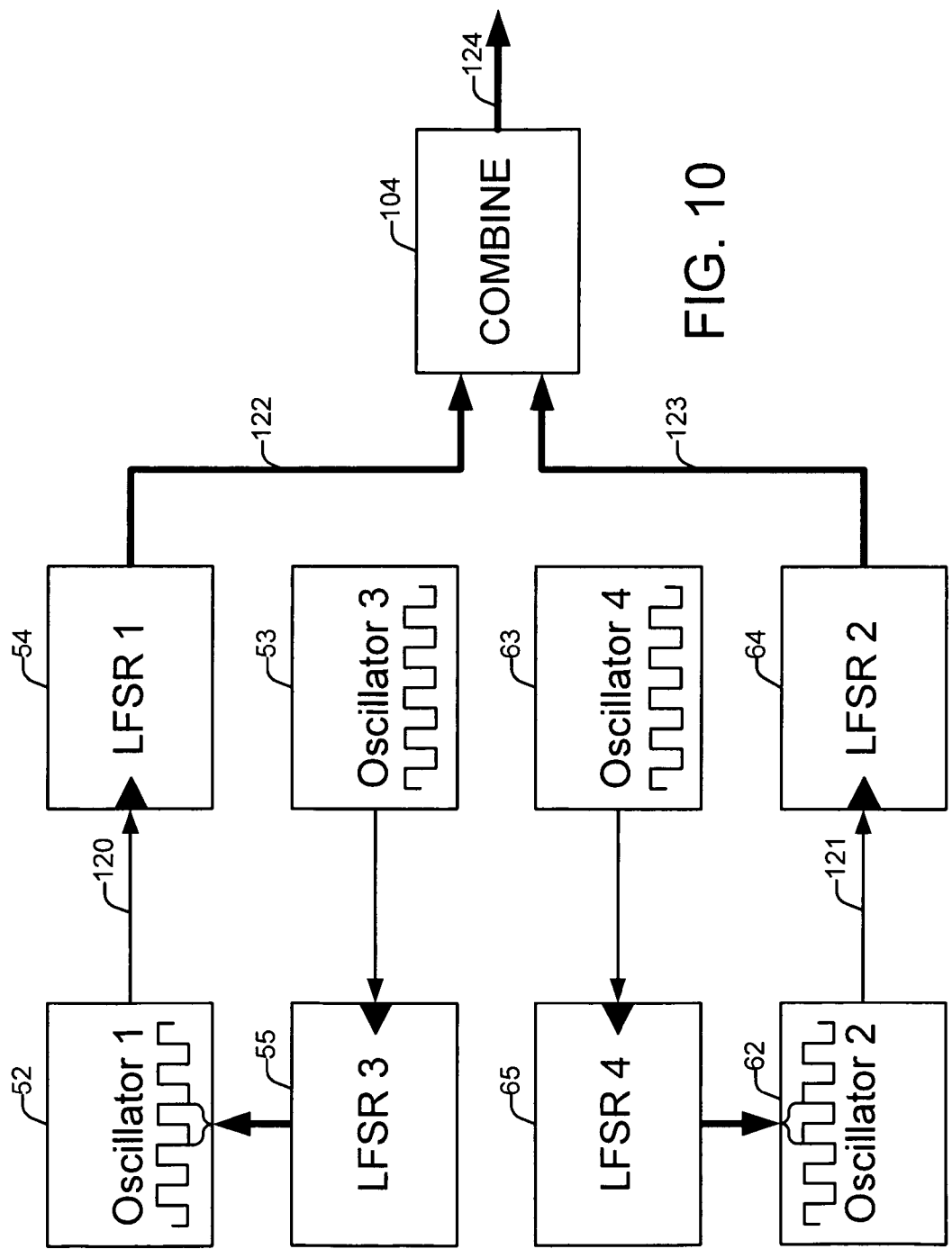
FIG. 10 is a drawing showing an example of true random number generator ("TRNG"), in accordance with a ninth embodiment of the present invention.

FIG. 10 is a drawing showing an example of a true random number generator ("TRNG"), in accordance with a ninth embodiment of the present invention. This embodiment is similar to the embodiment shown in FIG. 3. In this embodiment, both the first oscillator 52 and second oscillator 62 are variable frequency oscillators, each controlled by a separate PRNG. A third oscillator 53 is coupled to and provides a clock signal to a third LFSR 55, which in turn is coupled to and provides control or select signals to the first oscillator 52 in order to provide pseudorandom variation of the first oscillator 52 frequency. Similarly, a fourth oscillator 63 is coupled to and provides a clock signal to a fourth LFSR 65, which in turn is coupled to and provides control or select signals to the second oscillator 62 in order to provide pseudorandom variation of the second oscillator 62 frequency.

Figure 11:
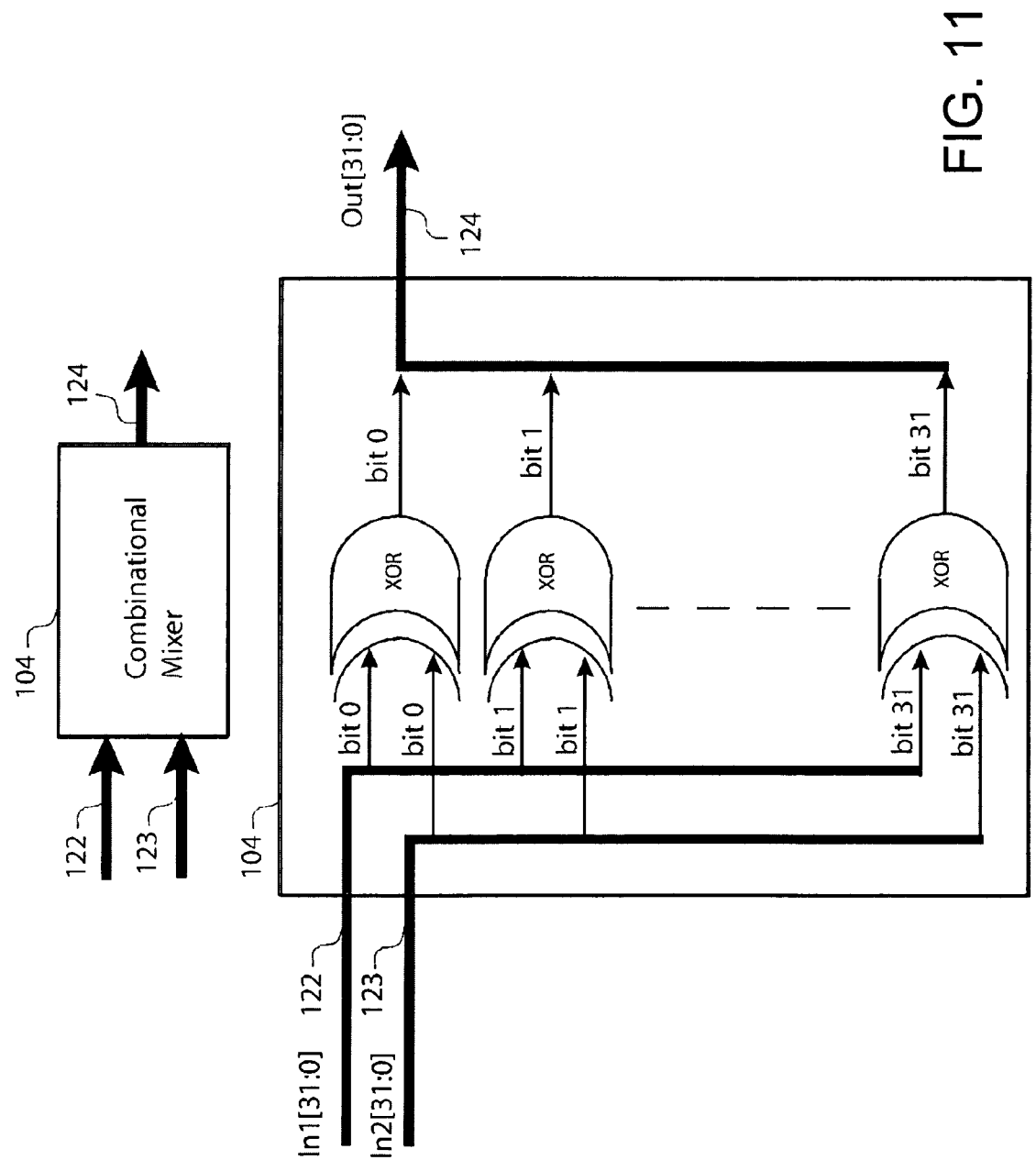
FIG. 11 is a drawing illustrating combinational mixer details, in accordance with one embodiment of the present invention.

FIG. 11 is a drawing illustrating Combinational Mixer details 104, in accordance with one embodiment of the present invention. In this example, the two input signals $In_1$ 122 and $In_2$ 123 are thirty-two (32) bits wide/long. They are combined by adding (XOR) the corresponding bits from $In_1$ 122 and $In_3$ 123 to generate a corresponding thirty-two bit output signal Out 124. This is exemplary, and other methods of combining input signals and the sizes or widths of input and output signals are also within the scope of this invention.

The value returned on the data bus, part of system bus 20 in FIG. 1, is the (in this example thirty-two bit) Out signal 124, output of Combinational Mixer module 104. Depending on features of TRNG module 17 (configurable module with enable/disable of the module activity, modifiable polynomials), it is desirable for user configurable registers and status information that can be accessed through the system bus of a microcontroller as described in FIG. 1, so that the output signal 124 can be multiplexed with other data (e.g. configuration registers, status of module 14) prior to being sent on data part of system bus 20. An example of waveforms of circuitry of FIGS. 2-10 is described in FIG. 15.

FIG. 12 is a drawing illustrating details of an example of a Linear Feedback Shift Register ("LFSR"), in accordance with an embodiment of the present invention. In its minimal architecture, a typical LFSR comprises a shift register whose elements are made of (clocked) D Flip-Flops ("DFF") 203, 204, . . . , 208 connected in series. The first DFF 203 is driven by the sum of several DFF 205, 207 outputs ("taps"). The sum may be physically implemented with a series of XOR gates 200, 201, 202. This circuitry acts like a well known binary counter by repeating a sequence of binary values. The sequence is not ruled like the binary counter with a simple formula like $X_{t1}=X_{t0}+1$ (where t0, t1 represents time for each clock cycle of the CLOCK signal) but rather uses the formula:

$$X_t = 1 + T_1 \cdot X_1 + T_2 \cdot X_2 + \ldots + T_N \cdot X_N$$

where $X_N$ represents the value of $N^{th}$ DFF of the series and $T_N$ is zero (0) if there is no logical combination/connection of $N^{th}$ DFF output to $1^{st}$ DFF input, 1 if there is (the "taps"). This is one form for the characteristic or feedback polynomial describing a given LFSR. Depending on the connections (or taps), the length of the sequence differs but it is no longer than $2*exp_N-1$ whereas a classical binary counter sequence length is $2*exp_N$ (0 has no lock effect). A logical zero (0) for all DFF outputs would lock the repetition of binary sequence. To avoid such a lock state for any reason and to get the complete sequence, the circuitry detects a zero (0) on all DFFs except the last, and forces a one (1) on the first DFF (203) input in this case. This is physically implemented in this example with a NOR gate 209. So, if the numeric value "0000 . . . 01" is present on DFF outputs ('1' being the value of the last DFF 208, right location in the schematic), the next value will be 0000.00 because the last DFF 208 input is driven by a 0 and first DFF 203 input receives the value of feedback plus (+) 202 correction from NOR gate 209=>'1'+'1'='0' (base 2). For this new sequence value (all 0s), the zeros (0s) detection on "all outputs except the last one" is still active and forces a one (1) at the input of the first DFF 203 by adding (XOR) 202 in the output of the NOR gate 209 ('1'+'0' from feedback), thus preventing the lock state. Therefore NOR gate 209 allows the maximum possible length of a sequence for a LFSR based circuitry.

FIG. 13 is a drawing illustrating a typical programmable variable frequency ring oscillator ("VFRO"), in accordance with one embodiment of the present invention. A VFRO is one example of a variable frequency oscillator 52 shown in FIGS. 2-10 above, and VFRO is an example of a programmable variable frequency clock generator. Variable frequency ring oscillators can be constructed by modifying Fixed Frequency Ring Oscillators ("FFRO"), which are example of Fixed Frequency Oscillators ("FFO") 62 shown in FIGS. 2, 4, 5, 6, and 8 above, and which are, in turn, examples of fixed frequency clock generators. FFROs can be constructed of an odd number of inverters 407. 408, 409 connected in series where the last inverter 409 output feeds directly the first inverter 401 input and is fed back to drive its first inverter 401.

Due to intrinsic delay of combinational cells such inverters, a fixed frequency ring oscillator (FFRO) generates approximately a square wave at the output (120,121). The discrepancies with a true square wave are primarily due to the difference of propagation delays for CMOS cell when its output switches from 0 to 1 or 1 to 0, typically resulting from the performance difference between p-type and n-type transistors. If all inverters of the ring oscillator have the same electrical characteristics, $T_{pd\_hl}$=propagation delay high-to-low and $T_{pd\_lh}$=propagation delay low-to-high, then the ring oscillator frequency is:

$$\text{Freq}=1/(N\times(T_{pd\_hl}+T_{pd\_lw}))\text{MHz}$$

if $T_{pd\_hl}$ and $T_{pd\_lh}$ are given in microseconds. The frequency typically depends on temperature and voltage because propagation delay of cells depend also on these factors. The variation of frequency also depends on the manufacturing technology, therefore two circuits embedding the same architecture will typically not exactly generate the same frequency even if temperature and voltage are strictly the same. This is a good point for unpredictability in random number generation. To get a number from a frequency signal, an integration may be performed. But a basic integration performed by a binary counter clocked by output of the ring oscillator provides an image of the phase of the signal but remains linear and therefore highly predictable.

To improve the unpredictability of the circuitry described on FIG. 2, a ring oscillator can be modified to run at a programmable frequency. In order to make a true random number generator, the variation of frequency generally should be unpredictable or difficult to estimate. A variation of frequency can be achieved by modifying the number of basic delays (inverters or others) of the ring oscillator. Typically, in order to make the ring oscillator programmable, it should typically be possible to bypass basic delays or not according to a select input. Multiplexers can be used for this purpose.

In FIG. 13, programmable basic delay elements 410 and 411 are added in the ring. Each delay is realized by means of the intrinsic propagation delay of inverters 401, 402 and multiplexer 403 or 404, 405 and multiplexer 406. These delay elements are non inverting of the logical level since each delay increment utilizes an even number of inverters. Thus, if the number of fixed basic delay elements (407, 408, 409) is odd, the number of programmable delay elements should be even, resulting in an odd total number of delay elements. The input of multiplexers 403, 406 allows a modification of the delay of the ring. For example if "$sel_1$" input (423) is cleared, multiplexer 406 output 421 is a copy of VFRO output 420, a small intrinsic delay is added in the ring. If the $sel_1$ input pin 423 is set, multiplexer 406 selects output of 405, therefore the added delay corresponds to two (2) inverter delays plus the input to output delay of the multiplexer 406. Therefore in such case, ring total delay depends on logical value of pin "$sel_0$". if cleared, only programmable delay is added in the ring else two (2) inverter delays are also added.

In this example of a VFRO, two programmed delay cells 410, 411, are coupled in series with an odd number of inverters 407, 408, 409 to generate an output signal 420. The first programmable delay cell 410 comprises an even number of inverters 401, 402, connected in series with and providing a second input to a first multiplexer 403 with a first multiplexer select ($Sel_0$) 422. The input of the first inverter 401 is the first input to the multiplexer 403, and the output of the first multiplexer 403 is the output of the first programmable delay cell 410. Similarly, the second programmable delay cell 411 comprises an even number of inverters 404, 405, connected in series with and providing a second input to a multiplexer 405 with a second multiplexer select ($Sel_1$) 423. The input of the first inverter 404 is the first input to the second multiplexer 406, and the output of the second multiplexer 403 is the output of the second programmable delay cell 411. Thus, the delay for the first programmable delay cell 410 is the intrinsic propagation delay of the first multiplexer 403 if the first select ($Sel_0$) 422 is negated (0), and that of the intrinsic propagation delays of the first multiplexer 403 and the even number of inverters 401, 402, if the first select (Sel$_0$) 422 is asserted (1). The second programmable delay cell 411 operates similarly. The length of the clock signal 420 is thus twice the sum of the two (or more) programmable delay cells 410, 411 and the intrinsic propagation delays of the odd number of delay elements (inverters here) 407, 408, 409. Other implementations and types of programmable variable frequency clock generators are also within the scope of the present invention, including voltage controlled oscillator (VCO) and other types of numerically controlled oscillators (NCO).

Figure 14:
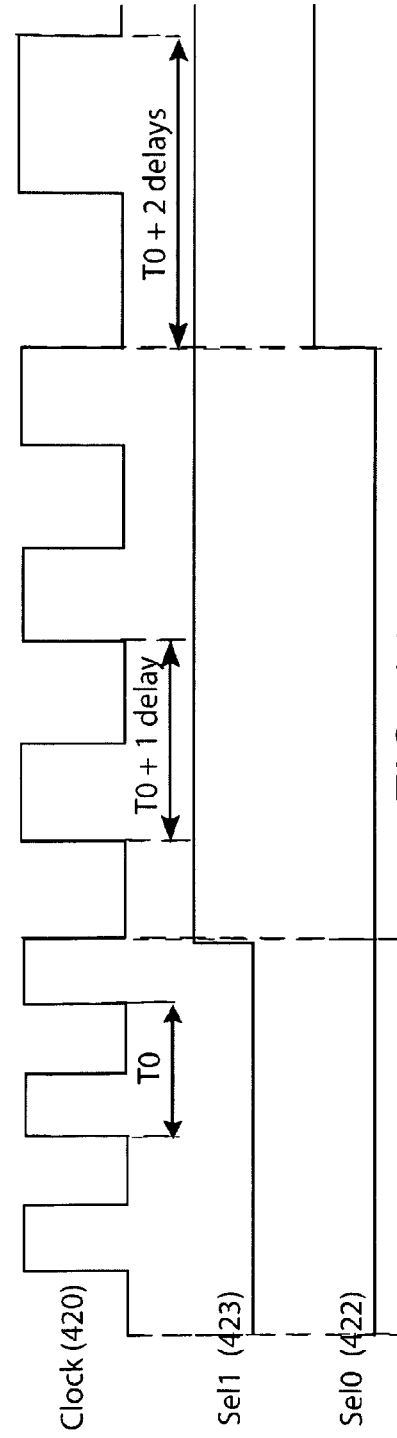
FIG. 14 is a diagram illustrating sample waveforms generated by the VFRO shown in FIG. 13.

FIG. 14 is a diagram illustrating a sample waveforms generated by the VFRO shown in FIG. 13. Depending on the number of basic programmable delays of the ring, the frequency varies. Several options exist to drive the select inputs 422, 423 of the VFRO. Three signals are shown here, Sel$_0$ 422, Sel$_1$ 423, and the resulting Clock 420. At the left, with both Sel$_0$ 422 and Sel$_1$ 423 negated (0), the resulting Clock 420 signal is a narrow square wave. The square wave Clock signal 420 increases in length in the middle as Sel$_1$ 423 is asserted (1), and increases even more when Sel$_0$ 422 is also asserted (1). Thus, as more selects 422, 423 are asserted, the length of the Clock signal 420 square wave lengthens, and the VFRO runs at a correspondingly slower frequency.

Figure 15:
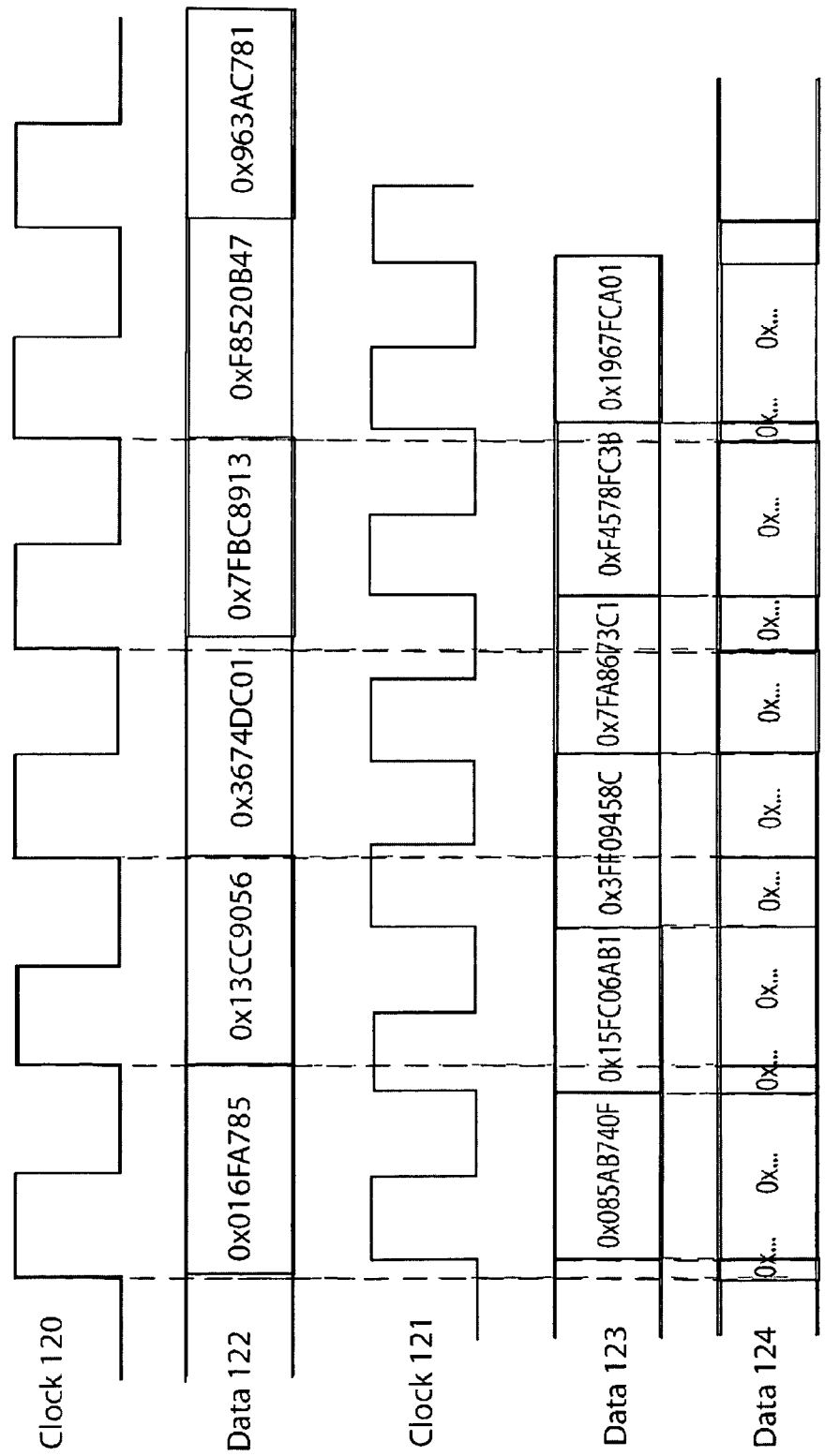
FIG. 15 is a diagram illustrating waveforms of a TRNG, in accordance with one embodiment of the present invention.

FIG. 15 is a diagram illustrating waveforms of a TRNG, in accordance with one embodiment of the present invention. Clock signals 120 and 121 are shown (outputs from Oscillators 52, 62) with the corresponding outputs 122, 123 from the two corresponding LFSRs 54, 64. The output 124 from the Combinational Mixer 104 is shown on the bottom, based on its inputs 122, 123 from the two LFSRs 54, 64. In this example, the second oscillator 62 is running faster than the first oscillator 52, resulting in a faster clock signal 123 than the clock signal 120 from the first oscillator 52. The resulting output 123 from the second LFSR 64 is thus also running faster than the output 122 from the first LFSR 54.

Other similar and/or derivative architectures are also within the scope of the present invention. Those skilled in the art will recognize that modifications and variations can be made without departing from the spirit of the invention. Therefore, it is intended that this invention encompass all such variations and modifications as fall within the scope of the appended claims.

What is claimed is:

1. A circuitry for generating random data comprising:
a first oscillator having an output frequency that is selectable through a select input of this first oscillator;
a first means for dynamically varying the output frequency of the first oscillator coupled to and providing output signals to the select input of the first oscillator;
a second oscillator;
a first circuitry coupled to an output of the first oscillator, the first circuitry providing a multi-bit value capable of being modified at each clock cycle generated by the output of the first oscillator;
a second circuitry coupled to an output of the second oscillator, the second circuitry providing a multi-bit value capable of being modified at each clock cycle generated by the output of the second oscillator; and
a combinational circuitry combining the multi-bit value provided by the first circuitry and the multi-bit value provided by the second circuitry in order to generate a multi-bit random number.

2. The circuitry in claim 1 wherein:
the first means for dynamically varying the output frequency comprises:
a first capture circuitry capturing the multi-bit value provided by the second circuitry and processing that multi-bit value to drive the select input of the first oscillator.

3. The circuitry in claim 2 wherein:
the second oscillator has an output frequency that is selectable through a select input of this second oscillator; and
the circuitry further comprises:
a second means for dynamically varying the output frequency of the second oscillator coupled to the select input of the second oscillator comprising:
a second capture circuitry capturing the multi-bit value provided by the first circuitry and processing that multi-bit value to drive the select input of the second oscillator.

4. The circuitry in claim 1 wherein:
the first means for dynamically varying the output frequency comprises:
a first capture circuitry capturing the multi-bit value provided by the first circuitry and processing that multi-bit value to drive the select input of the first oscillator.

5. The circuitry in claim 1 wherein:
the input select of the first oscillator is responsive to at least some of the multi-bit value provided by the first circuitry in modifying the output frequency of the first oscillator.

6. The circuitry in claim 1 wherein:
the input select of the first oscillator is responsive to at least some of the multi-bit value provided by the second circuitry in modifying the output frequency of the first oscillator.

7. The circuitry in claim 1 wherein:
at least one of a set comprising the first oscillator and the second oscillator is a numerically controlled oscillator (NCO).

8. The circuitry in claim 1 wherein:
at least one of a set comprising the first oscillator and the second oscillator is a voltage controlled oscillator (VCO).

9. The circuitry in claim 1 wherein:
at least one of a set comprising the first circuitry and the second circuitry comprises a linear feedback shift register (LFSR).

10. The circuitry in claim 9 wherein:
both the first circuitry and the second circuitry comprise a linear feedback shift register (LFSR).

11. The circuitry in claim 10 wherein:
the linear feedback shift register (LFSR) includes a logic to generate a set of output values that are powers of 2.

12. The circuitry in claim 1 wherein:
at least one of a set comprising the first oscillator and the second oscillator is a ring oscillator.

13. The circuitry in claim 1 wherein:
at least one of a set comprising the first circuitry and the second circuitry comprises a counter where a single bit is modified for each triggering edge of a clock driving the counter.

14. The circuitry in claim 1 wherein:
an architecture of the first circuitry and an architecture of the second circuitry are different.

15. The circuitry in claim 1 wherein:
the first oscillator comprises a plurality of inverters coupled in series, a number of active inverters in the first oscillator being selectable through the select input of this first ring oscillator.

16. The circuitry in claim 1 wherein:
an architecture of the first circuitry is a linear feedback shift register (LFSR) and an architecture of the second circuitry architecture is a non-binary code counter.

17. The circuitry in claim 1 wherein:
a one of a set comprising the first circuitry and the second circuitry comprises a counter where a single bit is modified for each triggering edge of a clock driving this counter.

18. The circuitry in claim 1 wherein:
the second oscillator has an output frequency that is selectable through a select input of this second oscillator; and
the circuitry further comprises:
  a second means for dynamically varying the output frequency of the second oscillator coupled to the select input of the second oscillator; and
  the first means for dynamically varying the output frequency and the second means for dynamically varying the output frequency comprise:
    a third oscillator;
    a third circuitry coupled to an output of the third oscillator, the third circuitry providing a value capable of being modified at each clock cycle generated by the output of the third oscillator, wherein an output of the third circuitry is coupled to and provides input signals to the select input of the first oscillator in order to vary the output frequency of the first oscillator and is coupled to and provides input signals to the select input of the second oscillator in order to vary the output frequency of the second oscillator.

19. The circuitry in claim 1 wherein:
the means for dynamically varying the output frequency of the first oscillator comprises:
  a third oscillator;
  a third circuitry coupled to an output of the third oscillator, the third circuitry providing a value capable of being modified at each clock cycle generated by the output of the third oscillator, wherein an output of the third circuitry is coupled to and provides input signals to the select input of the first oscillator in order to vary the output frequency of the first oscillator;
  the second oscillator has an output frequency that is selectable through a select input of this second oscillator; and
  the circuitry further comprises:
    a means for dynamically varying the output frequency of the second oscillator coupled to the select input of the second oscillator comprising: a fourth oscillator;
    a fourth circuitry coupled to an output of the fourth oscillator, the fourth circuitry providing a value capable of being modified at each clock cycle generated by the output of the fourth oscillator, wherein an output of the fourth circuitry is coupled to and provides input signals to the select input of the second oscillator in order to vary the output frequency of the second oscillator.

20. A microcontroller circuitry having access to a peripheral unit having an architecture according to claim 1.

21. A circuitry for generating random data comprising:
a first means for oscillation having an output frequency that is selectable through a select input of this first means for oscillation;
a first means for dynamically varying the output frequency of the first means for oscillation coupled to and providing output signals to the select input of the first means for oscillation;
a second means for oscillation having an output frequency that is selectable through a select input of this second means for oscillation;
a second means for dynamically varying the output frequency of the second means for oscillation coupled to and providing output signals to the select input of the second means for oscillation;
a first means for providing a multi-bit value capable of being modified at each clock cycle generated by an output of the first means for oscillation;
a second means for providing a multi-bit value capable of being modified at each clock cycle generated by an output of the first means for oscillation; and
a means for combining the multi-bit value provided by the first means for providing a multi-bit value and the multi-bit value provided by the second means for providing a multi-bit value in order to generate a multi-bit random number.

22. A microcontroller comprising:
a circuitry for generating random data comprising:
  a first oscillator having an output frequency that is selectable through a select input of this first oscillator;
  a first means for dynamically varying the output frequency of the first oscillator coupled to and providing output signals to the select input of the first oscillator;
  a second oscillator having an output frequency that is selectable through a select input of this second oscillator;
  a second means for dynamically varying the output frequency of the second oscillator coupled to and providing output signals to the select input of the second oscillator;
  a first circuitry coupled to an output of the first oscillator, the first circuitry providing a multi-bit value capable of being modified at each clock cycle generated by the output of the first oscillator;
  a second circuitry coupled to an output of the second oscillator, the second circuitry providing a multi-bit value capable of being modified at each clock cycle generated by the output of the second oscillator; and
  a combinational circuitry combining the multi-bit value provided by the first circuitry and the multi-bit value provided by the second circuitry in order to generate a multi-bit random number.

* * * * *

UNITED STATES PATENT AND TRADEMARK OFFICE
CERTIFICATE OF CORRECTION

PATENT NO. : 8,131,789 B2
APPLICATION NO. : 12/058309
DATED : March 6, 2012
INVENTOR(S) : Alain Vergnes et al.

It is certified that error appears in the above-identified patent and that said Letters Patent is hereby corrected as shown below:

Column 4 Line 52 After "(LFSR)" delete "54, 64 is".
Column 7 Line 36 Delete "0000.00" and insert -- 0000...00 --, therefor.
Column 8 Line 5 Delete " $Freq = 1/(N \times (T_{pd\_hl} + T_{pd\_lh})) MHz$ ," and insert -- $Freq = 1 / (N \times (T_{pd\_hl} + T_{pd\_lh})) MHz$ --, therefor.

Signed and Sealed this
Fourteenth Day of August, 2012

David J. Kappos
*Director of the United States Patent and Trademark Office*